US008713338B2

(12) United States Patent
Mobin et al.

(10) Patent No.: US 8,713,338 B2
(45) Date of Patent: Apr. 29, 2014

(54) METHODS AND APPARATUS FOR LOW POWER OUT-OF-BAND COMMUNICATIONS

(75) Inventors: Mohammad S. Mobin, Orefield, PA (US); Mehran Aliahmad, Manotick (CA); Matthew Tota, Clinton, NJ (US); Gregory Scott Winn, Fort Collins, CO (US)

(73) Assignee: LSI Corporation, San Jose, CA (US)

( * ) Notice: Subject to any disclaimer, the term of this patent is extended or adjusted under 35 U.S.C. 154(b) by 236 days.

(21) Appl. No.: 12/790,283

(22) Filed: May 28, 2010

(65) Prior Publication Data

US 2011/0296215 A1    Dec. 1, 2011

(51) Int. Cl.
*G06F 1/00* (2006.01)

(52) U.S. Cl.
USPC .......................................... 713/323; 713/324

(58) Field of Classification Search
CPC ................................. G06F 1/22; G06F 1/3287
USPC .................................................... 713/323, 324
See application file for complete search history.

(56) References Cited

U.S. PATENT DOCUMENTS

| | | | |
|---|---|---|---|
| 6,567,921 B1 | 5/2003 | Guziak | |
| 6,625,740 B1* | 9/2003 | Datar et al. | 713/324 |
| 7,051,227 B2 | 5/2006 | Kazachinsky et al. | 713/500 |
| 7,249,271 B2* | 7/2007 | Shibata et al. | 713/324 |
| 2007/0288778 A1 | 12/2007 | Zhuang et al. | |
| 2009/0251291 A1* | 10/2009 | Borcherding | 340/10.1 |
| 2010/0049881 A1 | 2/2010 | Manor et al. | |
| 2010/0088435 A1* | 4/2010 | Abe | 710/33 |

FOREIGN PATENT DOCUMENTS

WO    9820609 A1    5/1998

OTHER PUBLICATIONS

Cao et al, OC-192 Transmitter and Receiver in Standard .18-um CMOS, Dec. 2002, IEEE, Journal of Solid-State Circuits vol. 37 No. 12.*
"Universal Serial Bus Specification Revision 2.0," Universal Serial Bus Implementers Forum, Inc. (USB-IF), Apr. 27, 2000, pp. 31-36.
Y. Sun, "Bandwidth-Efficient Wireless OFDM," IEEE Journal on Selected Areas in Communications, Nov. 2001, pp. 2267-2278, vol. 19, No. 11.
"Universal Serial Bus 3.0 Specification," Revision 1.0, Nov. 12, 2008.
European Patent Office, European Search Report, Application No. EP 11167211.9, Aug. 12, 2011, pp. 1-6.

* cited by examiner

*Primary Examiner* — Kim Huynh
*Assistant Examiner* — Austin Hicks
(74) *Attorney, Agent, or Firm* — Otterstedt, Ellenbogen & Kammer, LLP

(57) ABSTRACT

A signal generator circuit for reducing power consumption of out-of-band message communications between a first device including the signal generator circuit and a second device coupled to the first device comprises a switching circuit and a controller coupled to the switching circuit. The controller is operative to receive a reference clock signal and at least a first control signal indicative of a request for the first device to send a message to the second device when the first device is in a first mode of operation. The controller generates an output control signal and an output data signal. The output control signal is operative as a function of the first control signal to selectively power up the switching circuit and a transmitter driver during the first mode. The output data signal includes the message supplied to the transmitter driver for transmission to the second device during the first mode.

21 Claims, 6 Drawing Sheets

100

400

600

700

METHODS AND APPARATUS FOR LOW POWER OUT-OF-BAND COMMUNICATIONS

FIELD OF THE INVENTION

The present invention relates generally to the electrical, electronic, and computer arts, and more particularly relates to electronic device communications.

BACKGROUND OF THE INVENTION

A high-speed Universal Serial Bus (USB) communications protocol, such as, for example, USB version 3.0 (USB3 or SuperSpeed USB), serializer/deserializer (SerDes) operating at 5 Gigabits per second (Gbps) requires extremely low power dissipation because USB is generally intended for portable devices where power consumption is a critical concern. During normal operation, USB 3.0 devices are typically in sleep (standby) mode most of the time in order to conserve power. Periodically, however, the USB 3.0 device is required to wake up for communication with a host device to which the USB device is connected.

While a connected USB device is in low power (e.g., sleep or standby) mode, it generally conveys its presence to the host device by sending a "ping" message (also referred to as "pinging"). The ping message is used to test the presence of an active client at the other end of the connection. A ping message is often sent at regular intervals if no other activity is detected coming from a given connection. If the connection fails to respond to a ping message within a prescribed period of time, that connection is closed.

In order to send a ping message, however, a link layer in the connected device is required to wake up the entire clock multiplication unit (CMU) and transmitter to send a two cycle "ping clock." This standard approach of sending out-of-band signals is costly, at least from a power perspective, and is therefore undesirable, particularly for mobile devices which seek to minimize power consumption.

SUMMARY OF THE INVENTION

Principles of the invention, in illustrative embodiments thereof, provide a novel USB (e.g., USB3) transceiver out-of-band signal generator suitable for use in low-power portable and/or desktop applications. The USB transceiver out-of-band signal generator includes a localized low-frequency periodic signaling (LFPS) sideband signal generator adapted to operate while the bulk of the transceiver is in a low power (e.g., power-down or standby) mode of operation. Conventional SAS/SATA (serial-attached SCSI (small computer system interface)/serial advanced technology attachment) out-of-band signal generators wake up the entire transmitter and clock multiplication unit (CMU) to perform out-of-band communications and pay a non-competitive power penalty. Embodiments of the invention provide techniques for advantageously reducing power consumption in USB transceivers, and other connected devices having low power requirements, by using a reference clock source and a small state machine thereby making the signal generator response quick and inexpensive, at least from a power consumption perspective.

In accordance with one embodiment of the invention, signal generator circuit for reducing power consumption of message communications between a first device including the signal generator circuit and a second device coupled to the first device comprises a switching circuit and a controller coupled to the switching circuit. The controller is operative to receive a reference clock signal, to receive at least a first control signal indicative of a request for the first device to send a message to the second device when the first device is in a first mode of operation, and to generate an output control signal and an output data signal. The output control signal is operative as a function of the first control signal to selectively power up the switching circuit and a transmitter driver during the first mode. The output data signal includes the message supplied to the transmitter driver, via the switching circuit, for transmission to the second device during the first mode. Preferably, at least transmitter data path circuitry, transmitter clock path circuitry and/or a clock multiplication unit in the first device remain powered down when the first device is in the first mode.

In accordance with another embodiment of the invention, a serial device having reduced power consumption for message communications between the serial device and a host device in operative communication with the serial device includes a transmitter. The transmitter includes at least data path circuitry operative to receive an input data word and to generate an output data stream, clock path circuitry operative to generate at least one control signal for controlling processing of the input data word, and a driver operative to transmit the output data stream to the host device. A clock multiplication unit included in the serial device is operative to generate at least one timing signal for use by the clock path circuitry in the transmitter. The serial device further includes a signal generator circuit comprising a switching circuit and a controller coupled to the switching circuit. The controller is operative to receive a reference clock signal, to receive at least a first control signal indicative of a request for the serial device to send a message to the host device when the serial device is in a first mode of operation, and to generate an output control signal and an output data signal. The output control signal is operative, as a function of the at least first control signal, to selectively power up the switching circuit and the driver in the transmitter during the first mode. The output data signal comprising the message is supplied to the driver, via the switching circuit, for transmission to the host device during the first mode.

In accordance with yet another embodiment of the invention, a method is provided for reducing power consumption of message communications between a first device and a second device in operative communication with the first device. The method includes the steps of: receiving, in the first device, a reference clock signal; receiving, in the first device, at least a first control signal indicative of a request for the first device to send a message to the second device when the first device is in a first mode of operation, the message indicating a presence of the first device to the second device; and generating, in the first device, an output control signal and an output data signal, the output control signal being operative as a function of the at least first control signal to selectively power up a switching circuit and a transmitter driver in the first device during the first mode, the output data signal comprising the message supplied to the transmitter driver, via the switching circuit, for transmission to the second device during the first mode, the message being synchronized to the reference clock signal.

These and other features, objects and advantages of the present invention will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION OF PREFERRED EMBODIMENTS

Principles of the present invention will be described herein in the context of illustrative embodiments of a low-power serializer/deserializer (SerDes) transceiver suitable for use, for example, in a portable USB or other serial device. It is to be appreciated, however, that the invention is not limited to the specific apparatus and methods illustratively shown and described herein. Rather, aspects of the invention are directed broadly to techniques for beneficially reducing power consumption in a connected serial device, such as, for example, a SerDes device, particularly by reducing the amount of power required for the connected device to broadcast its presence to a corresponding host device. In this manner, aspects of the invention provide a low-power solution for out-of-band communications between a host controller and a corresponding connected device.

While illustrative embodiments of the invention will be described herein with reference to a USB communications protocol, particularly USB 3.0, it is to be appreciated that the invention is not limited to use with the USB protocol. Rather, principles of the invention may be extended to essentially any serial communications protocol (standard or non-standard), both wired and wireless, including, for example, SAS and SATA communications protocols. Moreover, it will become apparent to those skilled in the art given the teachings herein that numerous modifications can be made to the embodiments shown that are within the scope of the present invention. That is, no limitations with respect to the specific embodiments described herein are intended or should be inferred.

Figure 1:
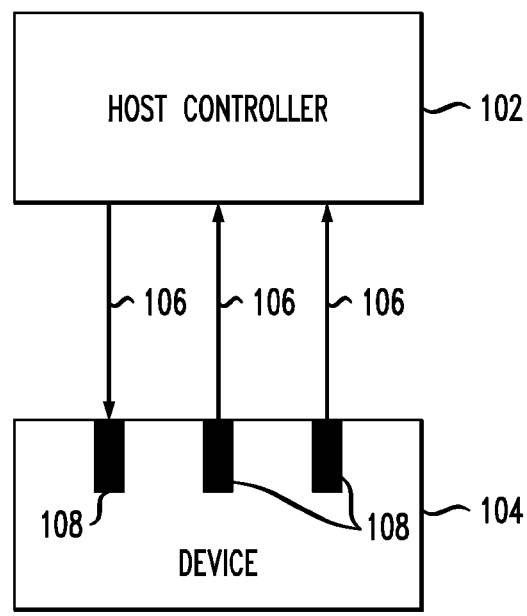
FIG. 1 is a block diagram depicting an illustrative system for facilitating data communications between two devices, according to a conventional USB connection arrangement.

FIG. 1 is a block diagram depicting an illustrative system 100 for facilitating data communications between two devices, according to a conventional USB connection arrangement. Specifically, system 100 includes a first device functioning as a host controller 102 and a second device 104, which may be a USB device, operatively coupled to the host controller. Device 104 may be referred to herein as a "connected device." Host controller 102 may comprise, for example, a computer or alternative processing apparatus, and connected device 104 may comprise, for example, a USB-enabled peripheral device (e.g., scanner, digital camera, storage device, cell phone, personal digital assistant (PDA), flash card reader, network interface, etc.). A physical USB device 104 may include a plurality of logical sub-devices, referred to herein as "device functions," with each device function being assigned a unique identifier (e.g., address) by the host controller 102. Up to 127 devices, including hub devices, may be connected to a given host controller in accordance with the USB standard.

Communications between two or more USB devices are based on logic channels, often referred to as "pipes" 106. A pipe 106 is essentially a logical connection that is established between the host controller 102 and a corresponding endpoint 108 in the USB connected device 104. Unlike an endpoint 108 which physically exists on the device 104, a pipe 106 is only present when the host controller 102 establishes a connection to the endpoint. A USB device, according to the USB specification (e.g., USB 1.x or 2.0 specification), can support up to 32 active pipes; 16 pipes into the host controller and 16 pipes out of the host controller. There are two types of pipes, namely, stream pipes and message pipes, that are assigned based on the type of data transfer (e.g., isochronous transfers, interrupt transfers, bulk transfers, and control transfers). See, e.g., "Universal Serial Bus Specification Revision 2.0," Universal Serial Bus Implementers Forum, Inc. (USB-IF), pp. 31-36, Apr. 27, 2000, and subsequent versions and revisions thereto, the disclosures of which are incorporated herein by reference in their entirety for all purposes.

In order to determine that the USB device 104 is still connected to its host controller 102, the host controller may monitor data communications between the USB device and the host controller, for example, by detecting data packets passing to and/or from the connected device. However, when the device 104 is idle, such as during a sleep mode of operation, and thus no activity is detected from a given connection, the device indicates its presence by broadcasting a "ping" message to the host controller 102 at regular intervals. If the connection fails to respond to the ping message within a prescribed period of time, that connection is closed. Unfortunately, in order to broadcast the ping message, the USB device 104 must wake up the entire CMU and transmitter in the device to send a two cycle "ping clock." This approach is costly in terms of power consumption, and is therefore undesirable.

Figure 2:
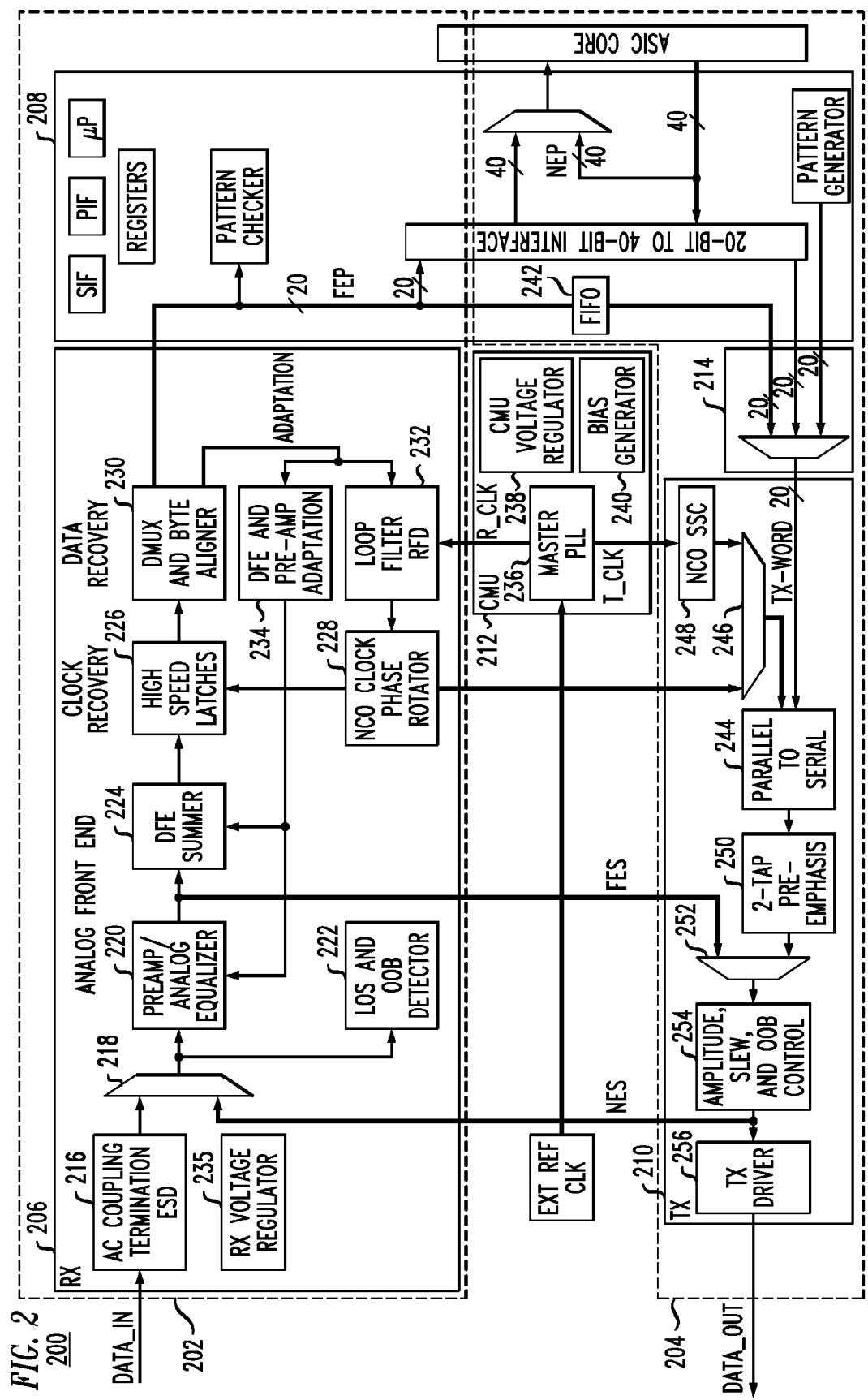
FIG. 2 is a block diagram depicting at least a portion of an illustrative serializer/deserializer (SerDes) transceiver which may be included in a connected device.

FIG. 2 is a block diagram depicting at least a portion of an illustrative SerDes transceiver 200 which may be included in a connected device and which may be modified to implement principles of the invention. Transceiver 200 may be divided into a first portion 202, a second portion 204, and a third portion 212 which comprises a clock multiplication unit (CMU). The first portion 202 includes a receiver (RX) data path 206 and a least a portion of a status and control circuit 208. The second portion 204 includes a transmitter (TX) 210, a first multiplexer 214, and at least a portion of status and control circuit 208. It is to be understood that the invention is not limited to the specific transceiver arrangement shown, but that alternative embodiments of the invention are similarly contemplated for implementing the SerDes transceiver 200, as will become apparent to those skilled in the art given the teachings herein.

Receiver data path 206 may be implemented in a conventional manner. For example, receiver data path 206 preferably includes an alternating current (ac) coupling and termination circuit 216 operative to remove a direct current (dc) component from an input data signal, Data in, presented to the receiver, and to protect the receiver from an electrostatic discharge (ESD) event. A second multiplexer 218 is coupled to the ac coupling termination circuit 216 and is operative to receive the input data signal at a first input and to receive a first control signal, which may be a near-end serial loopback signal (NES), at a second input. An output signal generated by the multiplexer 218 is fed to an analog front end which includes a preamplifier/analog equalizer 220, a loss of signal (LOS) and out-of-band (OOB) detector 222 and a decision feedback equalizer (DFE) and summer 224 coupled to the preamplifier/analog equalizer.

It is anticipated that most USB 3.0 devices will use dynamic receiver equalization of some sort to overcome signal loss common when operating at 5 gigahertz (GHz) frequencies. To accomplish dynamic receiver equalization, preamplifier/analog equalizer 220 and/or DFE 224 may be operative to perform analog signal filtering and decision feedback equalization in accordance with techniques well known to those skilled in the art. (See, e.g., T. Do-Hong, et al., "Principles of Digital Communications," Student Manual, Rice University, May 2008; S. Benedetto, et al., "Principles of Digital Transmission: With Wireless Applications," Published December 1998, Plenum Publishing Corporation, ISBN-13: 9780306457531; and Y. Sun, "Bandwidth-efficient Wireless OFDM," IEEE Journal on Selected Areas in Communications, Vol. 19, Issue 11, November 2001, pp. 2267-2278, the disclosures of which are incorporated herein by reference in their entireties for all purposes.) A DFE is a nonlinear equalizer that uses previous detector decisions to essentially eliminate inter-symbol interference (ISI), using a feedback loop, on pulses that are currently being demodulated. The ISI contributed by the previously detected symbols can be cancelled out exactly from the output of a forward filter by subtracting past symbol values with appropriate weighting. In this manner, distortion on a current pulse that was introduced by previous pulses can be eliminated.

An output signal generated by DFE 224 is preferably fed to clock and data recovery sections of the receiver data path 206. More particularly, the clock recovery section includes high-speed latch circuitry 226 having a data input operative to receive the output signal generated by DFE 224 and having a control input for receiving a second control signal generated by a numerically-controlled oscillator (NCO) clock phase rotator 228 coupled to the high-speed latch circuitry to adjust sampling phases of an input clock signal supplied to the clock phase rotator. NCO clock phase rotator 228 is preferably operative to generate multiple output clocks based on the input clock presented thereto, the respective output clocks having different phases relative to one another.

The data recovery section of receiver data path 206 preferably includes a demultiplexer (DMUX) and byte aligner 230 coupled to an output of the high-speed latch circuitry 226. An output data signal generated by the DMUX and byte aligner 230 is supplied to both a loop filter and rotational frequency divider (RFD) 232 and to a DFE and pre-amplifier adaptation circuit 234. Loop filter and RFD 232 is operative to receive an input clock signal, which may be a receiver clock signal, R_CLK, supplied by a master phase-locked loop (PLL) 236 in CMU 212, and to generate an output clock signal that is a multiple or a division of R_CLK. This output clock signal is supplied to NCO clock phase rotator 228. The DFE and pre-amplifier adaptation circuit 234 is operative to generate a control signal which is fed to pre-amp/analog equalizer 220 and to DFE 224 for controlling pre-amplification and DFE adaptations, respectively, to thereby provide dynamic receiver equalization. The output data generated by DMUX and byte aligner 230 is supplied to a first-in-first-out (FIFO) register 242, or alternative storage circuit, included in control circuit 208. FIFO register 242 is operative to at least temporarily store the recovered data.

Receiver data path 206 may further include a voltage regulator 235. Voltage regulator 235 is operative as a reference voltage source, generating at least one substantially constant output voltage which may be used to power one or more portions of the receiver data path 206. It is to be appreciated that alternative receiver arrangements suitable for use with the present invention are contemplated, as will become apparent to those skilled in the art.

Master PLL 236 included in CMU 212 is preferably operative to receive an external reference clock and to generate the receiver clock signal R_CLK supplied to loop filter and RFD 232, as previously described. Master PLL 236 is also operative to generate a second clock signal, which may be a transmitter clock signal, T_CLK, as a function of the external reference clock. The receiver and transmitter clock signals, although based on the same external reference clock, may be generated by separate PLL circuits included in master PLL 236, and hence may not necessarily be of the same frequency or multiples of the same frequency. CMU 212 may include other functional circuits, such as, for example, a CMU voltage regulator 238 and a bias generator 240 which may be used by master PLL 236 in generating the receiver and transmitter clock signals R_CLK and T_CLK, respectively.

Transmitter 210 may be implemented in a conventional manner. For example, transmitter 210 preferably includes a parallel-to-serial converter 244 operative to receive input data, which may be a transmit word (tx_word), in parallel from multiplexer 214 (e.g., 20 bits wide) and to convert this data into an output serial data stream. A third multiplexer 246 preferably generates a clock signal which is supplied to the parallel-to-serial converter 244 for synchronizing the output serial data stream. The clock signal generated by multiplexer 246 may be a function of either the NCO clock phase rotator 228 in the receiver 206 or it may be a function of the transmitter clock T_CLK generated by master PLL 236 and fed through NCO spread spectrum clocking (SSC) circuit 248. As is known by those skilled in the art, spread spectrum clocking is a frequency modulation technique for electromagnetic interference (EMI) reduction. Instead of maintaining a constant frequency, SSC modulates the clock frequency/period along a predetermined path, i.e., the modulation profile, with a predetermined modulation frequency, $f_m$.

The serial data stream generated by parallel-to-serial converter 244 is then fed to a 2-tap pre-emphasis circuit 250. The pre-emphasis circuit 250 is essentially operative as a high-pass filter to help prevent noise introduced into the transmission channel or receiver from being amplified, and thereby compensates for low-pass frequency characteristics of the transmission channel to which the transmitter 210 is operatively coupled. In this manner, the frequency response is flattened within a bandwidth of a prescribed frequency range. The pre-emphasis circuit 250 either amplifies a high frequency component or attenuates a low frequency component of the signal to be transmitted. Techniques for implementing pre-emphasis are well known by those skilled in the art.

The output of the pre-emphasis circuit 250 is fed to a fourth multiplexer 252. Multiplexer 252 includes a first input for receiving the output of the pre-emphasis circuit 250 and a second input for receiving the output of the preamp/analog equalizer 220 in the analog front end of receiver data path 206 and multiplexing one of these signals onto an output of the multiplexer. The output generated by multiplexer 252 is fed to an amplitude, slew and OOB control circuit 254 operative to control prescribed characteristics of the output signal from the multiplexer 252. The output signal generated by the amplitude, slew and OOB control circuit 254 is supplied to both the multiplexer 218 in receiver data path 206 and to a transmitter (TX) driver 256. The transmitter driver 256 is operative to generate an output signal, Data_out, of the transmitter 210.

Figure 3:
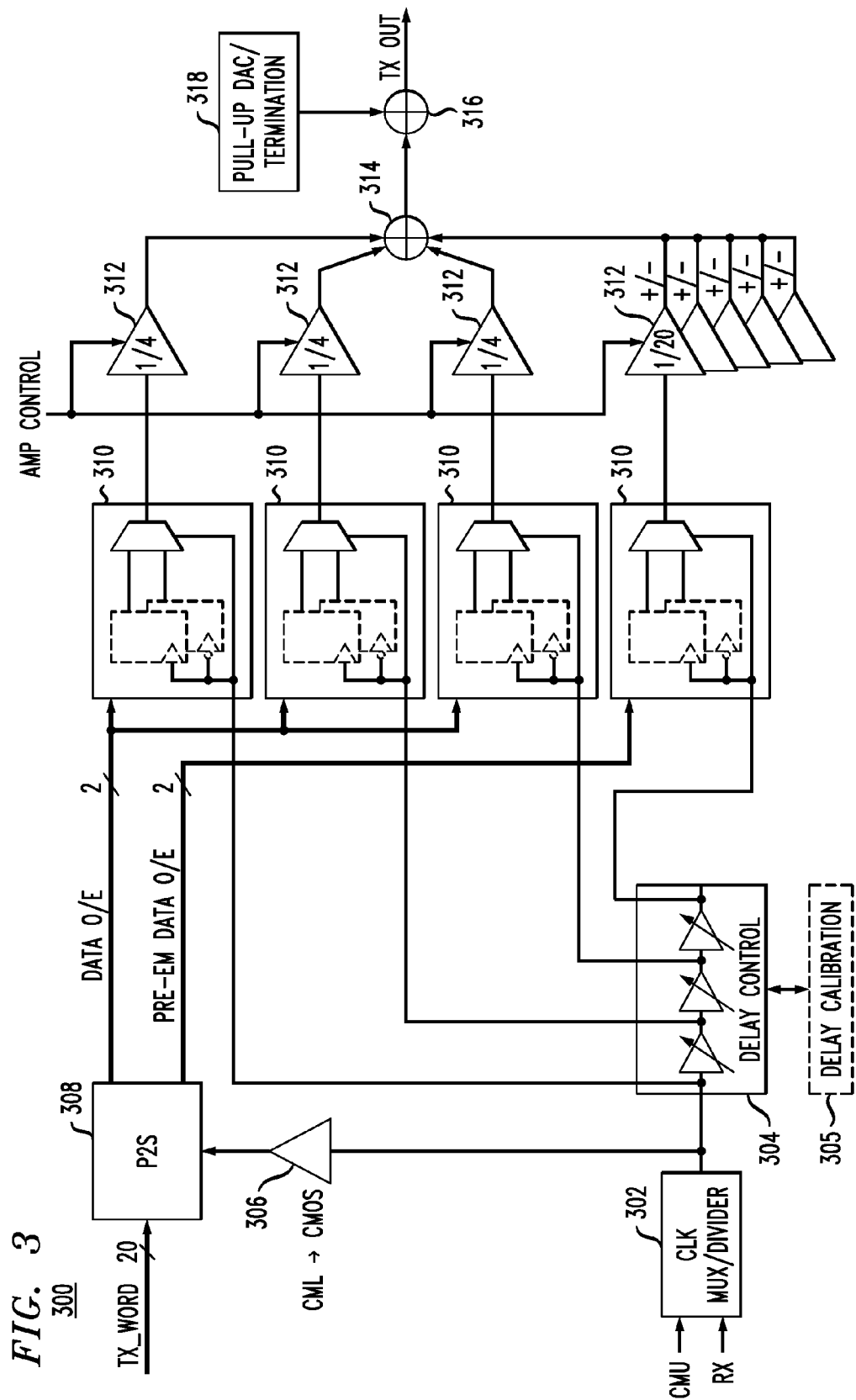
FIG. 3 is a schematic diagram illustrating an exemplary transmitter suitable for use in conjunction with the present invention.

With reference now to FIG. 3, an exemplary transmitter 300 is shown, which is suitable for use in conjunction with the present invention. Transmitter 300 may be one non-limiting implementation of transmitter 210 in the exemplary SerDes transceiver 200 depicted in FIG. 2. Again, the invention is not limited to the specific transmitter architecture shown.

Transmitter 300 includes a clock multiplexer (CLK MUX)/divider 302 operative to receive a plurality of clock signals; namely, a CMU clock signal (which may be, for example, a transmit clock (T_CLK) generated by CMU 212 in FIG. 2), and a receiver (RX) clock signal (which may, for example, be generated by NCO clock phase rotator 228 in receiver 206 shown in FIG. 2). Clock multiplexer/divider 302 may also receive a receiver front end clock signal (not shown), which may be generated, for example, by preamp/analog equalizer 220 in FIG. 2. These clock signals may be divided by a prescribed value and selectively supplied to a delay control circuit 304 coupled to the clock multiplexer/divider 302. Delay control circuit 304 may comprise a tapped delay line, as shown, or an alternative delay circuit. Optionally, a delay calibration circuit 305 may be coupled to the delay control circuit 304. The delay control circuit 304 is preferably operative to control a slew of the transmitter output signal, tx_out, generated by a driver stage in the transmitter 300. At least a portion of the delay control circuit 304 may be incorporated into the amplitude, slew and OOB control circuit 254 depicted in FIG. 2.

An output of the clock multiplexer/divider 302 is fed to a voltage level translator 306 operative to convert common-mode logic (CML) voltage levels to complementary metal-oxide-semiconductor (CMOS) voltage levels. The translated signals generated by voltage level translator 306 are supplied to a parallel-to-serial (P2S) converter 308. As described in connection with the parallel-to-serial converter circuit 244 in FIG. 2, P2S converter 308 is operative to convert a parallel input data word, tx_word, (e.g., 20 bits wide) received by the transmitter 300 into a serial data stream comprising a data output enable signal, Data O/E, and a pre-emphasis data output enable signal, Pre-em Data O/E. The Data O/E and Pre-em Data O/E signals generated by P2S converter 308 are preferably fed to a retiming circuit comprising a plurality of timing control blocks 310.

Each instance of the timing control blocks 310 includes a pair of flip-flops, 311a and 311b, and a multiplexer 311c coupled to the flip-flops. Specifically, each of the flip-flops 311a, 311b includes a data input for receiving a respective one of the serial data stream signals Data O/E generated by the parallel-to-serial converter 308, and a clock input for receiving a timing signal generated at a corresponding one of the taps in delay control circuit 304. Multiplexer 311c includes first and second inputs and an output. An output of each flip-flop 311a, 311b is coupled to a corresponding input of the multiplexer 311c. The flip-flops 311a, 311b are configured such that for a first one of the flip-flops 311a, input data supplied thereto is launched (i.e., clocked in) on a rising edge of the clock signal, and for a second one of the flip-flops 311b, input data supplied thereto is launched on a falling edge of the clock signal. The timing signal used to clock the flip-flops 311a, 311b is also used to select which one of the flip-flops to output data from. In this manner, output signals generated by each of the timing control blocks 310 will have well-defined rising and falling edges.

Output signals generated by the timing control blocks 310 are fed to corresponding amplifiers 312 forming an output driver stage in the transmitter 300. A gain of each of the amplifiers 312 may be the same or different relative to one another. The transmitter driver stage is shown as having four sets of amplifiers, although the invention is not limited to any particular number of distinct amplifier sets. Timing signals generated at each delay tap in delay control circuit 304 are preferably supplied to a corresponding one of the timing control blocks 310 to thereby control activation of the respective amplifiers 312 coupled thereto. In this manner, a slew of the output signal TX OUT can be controlled as desired.

Respective outputs of the amplifiers 312 are summed at summation block 314. The signal generated at an output of block 314 is then fed to a second summation block 316 to which a pull-up DAC termination circuit is coupled. The transmitter output signal TX OUT is generated at an output of summation block 316.

While a primary objective of the USB 3.0 specification is to increase available bandwidth, the new standard also seeks to reduce average power consumption, which is especially advantageous for mobile devices. USB 2.0 permanently polls for available devices, requiring power. In contrast, USB 3.0 was designed with additional power saving features like idle, sleep and suspend states. (See, e.g., "Universal Serial Bus 3.0 Specification," Revision 1.0, Nov. 12, 2008, the disclosure of which is incorporated herein by reference in its entirety for all purposes.) A device entering sleep mode will practically be left alone by USB 3.0 hosts until the device itself initiates a device mode change. However, even when a connected device is in sleep mode, it must still convey its presence to the host device by sending an out-of-band communication signal, also known as a "ping" message, at regular intervals if no other activity is detected from a given connection. Other communications protocols may employ analogous out-of-band signaling techniques to which principles of the invention will similarly apply, as will become apparent to the skilled artisan.

Figure 4:
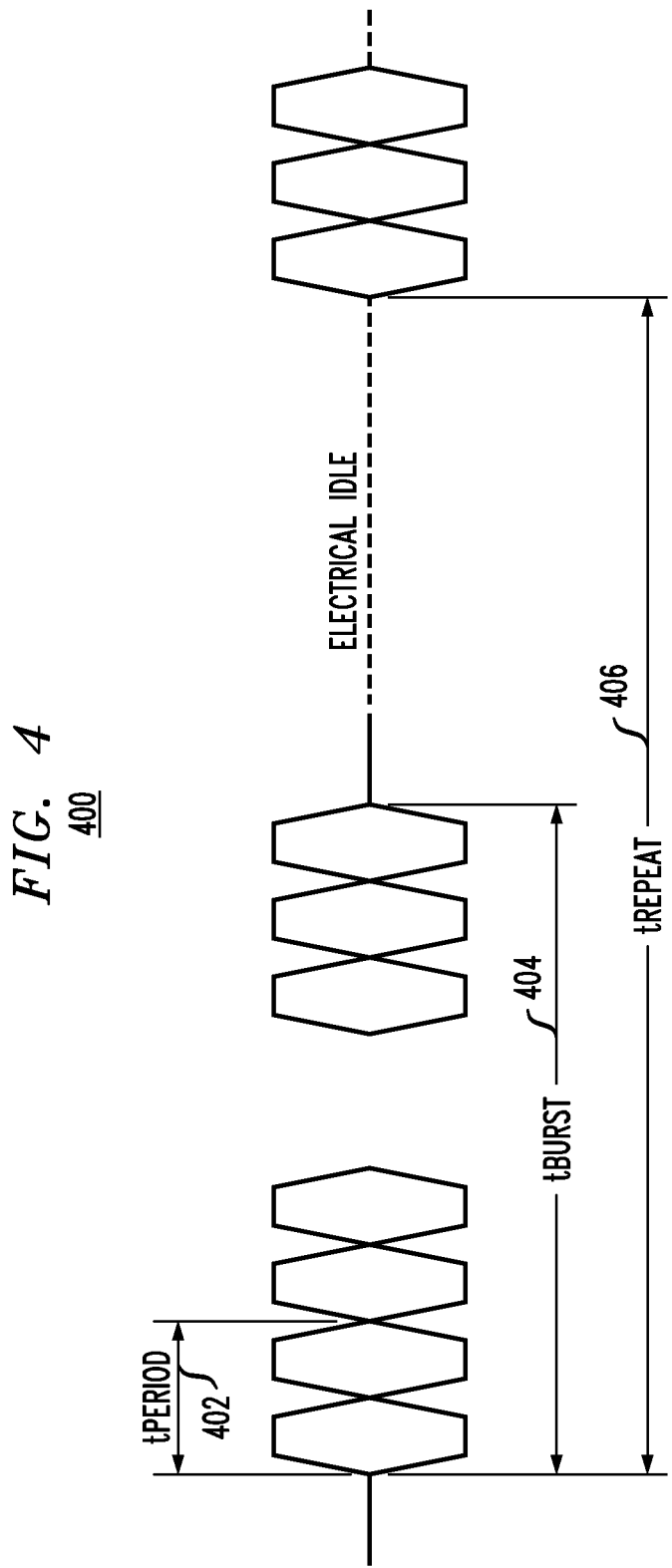
FIG. 4 is a timing diagram depicting an illustrative differential LFPS waveform.

By way of example only and without loss of generality, according to the USB 3.0 specification, low frequency periodic signaling (LFPS) is used for side band communication between two ports across a link that is in a low power link state. (See, "Universal Serial Bus 3.0 Specification," Revision 1.0, Section 6.9, November 2008.) An illustrative differential LFPS waveform 400 is shown in FIG. 4. With reference to FIG. 4, tPeriod 402 defines a period of an LFPS cycle. An LFPS burst is defined as the transmission of a continuous LFPS signal over a period of time represented by tBurst 404. An LFPS sequence is represented by the transmission of a single LFPS burst of duration tBurst over a period of time defined by tRepeat. Between two contiguous LFPS bursts the link is in an electrical idle state. An LFPS message is encoded as a function of the variation of the LFPS burst duration tBurst. The period of time tRepeat is defined as a time interval when the next LFPS message is transmitted. According to the USB 3.0 specification, the prescribed tPeriod is in a range between 20 and 100 nanoseconds (ns), with a maximum rise and fall time of 4 ns. (See "Universal Serial Bus 3.0 Specification," Revision 1.0, Section 6.9.1.) A "ping" message preferably comprises a two-cycle LFPS transmission (40 ns to 200 ns), in accordance with the USB 3.0 specification. It is to be appreciated, however, that other out-of-band message configurations and timings operative to communicate the presence of a connected device to a corresponding host controller are similarly contemplated for use in conjunction with the invention.

In order to send the ping message, a link layer in the connected device conventionally wakes up the entire CMU and transmitter in a SerDes transceiver in the device to send a two cycle "ping clock," as previously stated. These functional blocks, namely, the CMU and transmitter, are perhaps the most power-consuming blocks in the SerDes. It is to be understood that the specific number of cycles of the out-of-band communication signal (e.g., ping message) is not limited by the present invention.

In order to reduce power consumption for out-of-band communications between a connected device and its corresponding host, particularly while the device is in a low power mode (i.e., power-down or sleep mode), aspects of the invention, in illustrative embodiments thereof, provide a novel out-of-band signal generator suitable for use, for example, in low-power mobile and/or desktop USB (e.g., USB3) applications. The out-of-band signal generator preferably includes a localized LFPS sideband signal generator adapted to operate while the bulk of the transceiver remains in a sleep or other inactive mode of operation (e.g., low power, power-down, standby, etc.) in which there is essentially no data traffic transmitted between the connected device and the host device and in which the device is operating below a maximum prescribed power consumption. Embodiments of the invention provide techniques for advantageously reducing power consumption in USB transceivers, and other connected devices having substantially low power requirements, by utilizing a small state machine clocked by an external reference clock, thereby making the LFPS generator response quick and inexpensive, at least from a power perspective.

Figure 5:
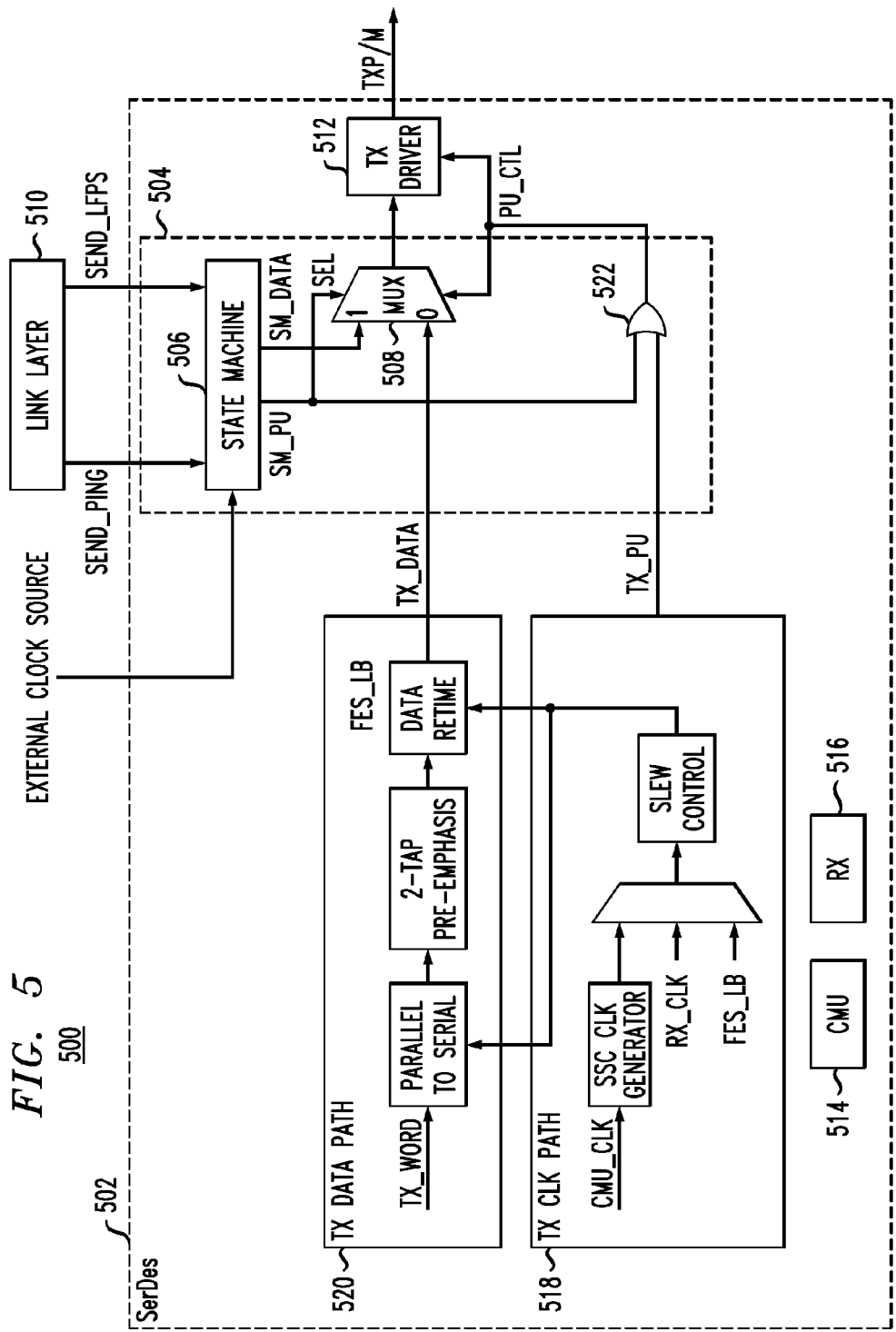
FIG. 5 is a block diagram depicting at least a portion of an exemplary transceiver including an out-of-band signal generator, according to an embodiment of the present invention.

FIG. 5 is a block diagram depicting at least a portion of an exemplary transceiver 502, which may be a SerDes transceiver, for use, for example, in a USB device 500, according to an embodiment of the invention. As previously stated, in order to reduce power consumption in the device 500, particularly while the device is in a sleep mode, transceiver 502 includes an out-of-band signal generator 504 comprising a state machine 506, or alternative controller, and a multiplexer 508, or alternative switching circuit, operatively coupled to the state machine.

Advantageously, the state machine 506 remains active (e.g., powered on, in a "wake" mode, etc.) and operational, even while the remaining transceiver 502 is inactive (e.g., powered off, in a sleep, power-down, etc., mode); the remaining transceiver circuitry, including, for example, CMU 514, receiver (RX) 516, transmitter clock path (TX_Clk Path) circuitry 518 and transmitter data path (TX data Path) circuitry 520, are all powered off. Transmitter data path circuitry 520 includes functional blocks (e.g., parallel-to-serial converter, pre-emphasis circuit, data retime circuit, etc.) operative to receive an input data word, tx_word, and to generate a serial output data stream, tx_data. Transmitter clock path circuitry 518 preferably includes functional blocks (e.g., SSC clock generator, multiplexer, slew control circuit, etc.) operative to generate clock and/or other timing/control signals for controlling one or more functional blocks in transmitter data path circuitry 520.

When a "SEND_PING" control signal is sent to transceiver 502 from a link layer 510 in the device 500, the state machine 506, which is preferably adapted to consume a relatively small amount of power (e.g., tens of microamperes), is operative to detect the SEND_PING signal and only power up (i.e., activate) the bare minimum circuitry (e.g., transmitter (TX) driver 512) necessary to transmit the ping message to the corresponding host device. The SEND_PING signal generated by link layer 510 and sent to state machine 506 is indicative of a request for the transceiver to send a ping message (thereby broadcasting its presence) to the host device.

Since the ping message is periodically sent to the host device to broadcast the continued presence of the connected device, particularly when the device is in standby or sleep mode (i.e., when no data is being transmitted between the device and its corresponding host), the SEND_PING signal is also periodically sent to state machine 506. Alternatively, according to other embodiments of the invention, the SEND_PING signal may be generated internally, such as, for example, by a timer or other low-power timing circuitry (not explicitly shown) included in transceiver 502.

When state machine 506 detects an asynchronous SEND_PING control signal from link layer 510, the message is synchronized with an external reference clock supplied to the state machine by an external clock source. In this manner, CMU 514, which ordinarily consumes significant power in the device, remains inactive (i.e., powered down, off, etc.). When a SEND_PING signal is detected, state machine 506 generates a power-up control signal, sm_pu, in response thereto which activates (i.e., powers up) multiplexer 508 and transmitter driver 512. Preferably, the power-up control signal generated by state machine 506 is fed to a first input of a functional OR circuit 522 (e.g., OR gate). A second input of OR gate 522 is adapted to receive a transmitter power-up control signal, tx_pu, generated by transmitter clock path circuitry 518. Thus, OR gate 522 is operative to generate a power-up control signal, pu_ctl, which is supplied to respective control (enable) inputs of multiplexer 508 and transmitter driver 512 for selectively activating the multiplexer and transmitter driver as a function of the power-up signal sm_pu generated by state machine 506 and/or the power-up signal tx_pu generated by the transmitter clock path circuitry 518.

State machine 506 then generates a data signal, sm_data, which preferably comprises a prescribed number of cycles (e.g., two) of the reference clock (i.e., ping clock), for example through toggling a toggle (T) flip-flop (not explicitly shown), or alternative signal generation circuitry, included in the state machine. It is to be appreciated that the invention is not limited to any specific number of cycles of the reference clock generated by the state machine 506 in response to the SEND_PING signal. Moreover, the number of cycles in the sm_data message signal generated by the state machine 506 is preferably independent of the duration of assertion of the SEND_PING signal (e.g., period of time from assertion until de-assertion of the SEND_PING signal). Toggle flip-flops are well known to those skilled in the art. The state machine data signal sm_data is supplied to transmitter driver 512 through multiplexer 508 (sm_data is fed to a first input ("1") of multiplexer 508). Multiplexer 508 is also operative to receive, at a second input ("0") thereof, the transmitter data signal tx_data generated by transmitter data path circuitry 520.

Multiplexer 508 does not only use the state machine power-up control signal sm_pu for activation; rather, the multiplexer input data path is also selected by sm_pu. Specifically, the state machine power-up control signal sm_pu is preferably supplied directly to a select control input, SEL, of multiplexer 508. When sm_pu is asserted (e.g., logic "1"), the state machine data sm_data is sent, through multiplexer 508, to the transmitter driver 512. Alternately, when sm_pu is de-asserted (e.g., logic "0"), the transmitter data tx_data from the transmitter data path 520 is sent to the transmitter driver 512 via multiplexer 508. In this manner, multiplexer 508 is operative to select either the state machine data signal sm_data or the transmitter data signal tx_data, depending upon the mode of operation of transceiver 502 (e.g., wake or sleep mode), for output to transmitter driver 512, assuming the power-up control signal pu_ctl supplied to the multiplexer and driver is asserted.

After transmitter driver 512 transmits the two-cycle ping clock, the SEND_PING signal is de-asserted. This action causes state machine 506 to de-assert the power-up control signal sm_pu, thereby powering down multiplexer 508 and transmitter driver 512. The multiplexer 508 and transmitter driver 512 can also be powered up independently by pu_ctl as a function of the tx_pu signal generated by the transmitter clock path circuitry 518, as previously stated. Assuming the sm_pu control signal is de-asserted, multiplexer 508 and transmitter driver 512 can also be powered down by de-assertion of the tx_pu control signal. The sm_pu control signal is preferably used in a first mode of operation of the transceiver 502, which may be a low power mode, and the tx_pu is used in a second mode of operation, which may be a normal (i.e., regular) mode wherein the transceiver 502 is powered up (i.e., activated).

Link layer 510 may also send a SEND_LFPS control signal to state machine 506, the SEND_LFPS signal being indicative of a request for the transceiver 502 in device 500 to send a LFPS message to the host device. The SEND_LFPS signal, being asynchronous, is preferably synchronized with the external reference clock by state machine 506. According to the USB 3.0 Specification (see, e.g., "Universal Serial Bus 3.0 Specification, Revision 1.0," section 6.9, pp. 6-30 through 6-35, the disclosure of which is incorporated herein by reference in its entirety), LFPS is used for side band communication between two ports across a link that is in a low power link state. When receiver termination is present but no signaling is occurring on the link, the device is considered to be in the electrical idle state (see FIG. 4). When in this state, LFPS is used to signal initialization and power management information.

Upon detection of the SEND_LFPS control signal, state machine 506 powers up multiplexer 508 and transmitter driver 512 by asserting the power-up signal sm_pu. State machine 506 then begins sending continuous reference clock cycles from the external clock source (e.g., through toggling a T flip-flop in the state machine) until the signal SEND_LFPS is de-asserted. Accordingly, the number of clock cycles in the sm_data message signal generated by state machine 506 will be a function of the duration of assertion of the SEND_LFPS signal. After the control signal SEND_LFPS is de-asserted (i.e., removed), state machine 506 powers down multiplexer 508 and transmitter driver 512, and the entire SerDes transceiver 502, except for the state machine, goes back into inactive (i.e., power-down) mode.

Figure 6:
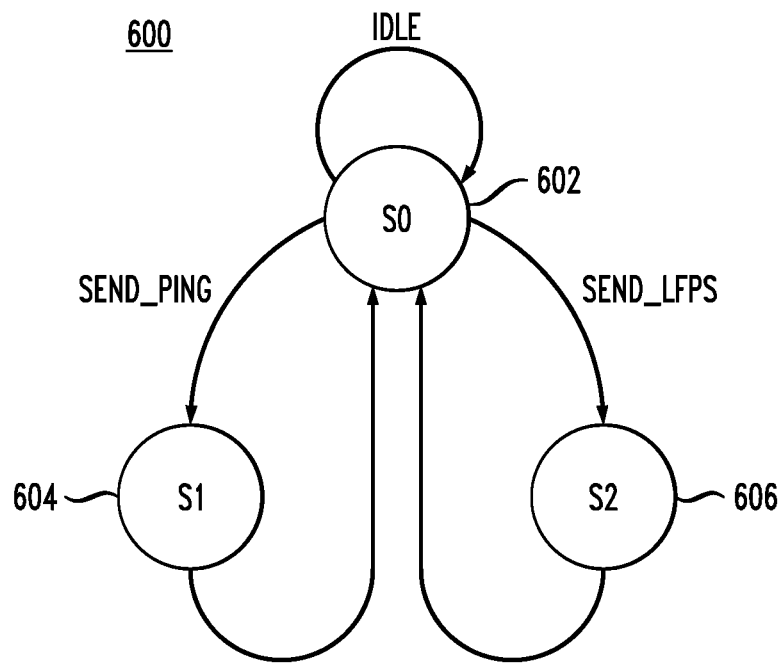
FIG. 6 is a state diagram depicting at least a portion of an exemplary state machine suitable for use in the illustrative transceiver shown in FIG. 5, according to an embodiment of the present invention.

FIG. 6 is a state diagram 600 depicting at least a portion of operations performed by an exemplary state machine suitable for use in the illustrative SerDes transceiver 502 shown in FIG. 5, according to an embodiment of the present invention. As apparent from FIG. 6, in a first state (S0) 602, the state machine is operative in an "idle" mode, wherein the state machine waits for either a SEND_PING signal or a SEND_LFPS control signal sent from a link layer (e.g., 510 in FIG. 5) in the device. During state 602, the state machine power-up signal (sm_pu) remains de-asserted so that the multiplexer and transmitter driver (e.g., 508 and 512, respectively, in FIG. 5) are both inactive (i.e., powered down), assuming the transmitter clock path circuitry (e.g., 518 in FIG. 5) remains in a low-power mode, and thereby the tx_pu signal remains de-asserted.

When a SEND_PING control signal is asserted, the state machine transitions from idle state 602 to a second state (S1) 604. In state 604, the state machine asserts the power-up control signal sm_pu, thereby activating (i.e., powering up) the multiplexer and transmitter driver (508 and 512, respectively, in FIG. 5). The sm_pu signal, being a logic "1," also selects the state machine data path in the multiplexer so as to configure the signal generator (504 in FIG. 5) for sending data received from the state machine (sm_data), as previously described. The state machine then sends a two-cycle ping message, or alternative out-of-band message, via state machine data signal sm_data, to the transmitter driver (512 in FIG. 5) (through the multiplexer) for transmission to the host controller. As previously stated, the invention is not limited to any particular number of cycles in the ping message, and moreover is preferably independent of the duration that the SEND_PING control signal remains asserted. After completion of the ping message, the sm_pu signal is de-asserted (e.g., logic "0"), thereby powering down the multiplexer and transmitter driver. The state machine then returns to the idle state 602.

Alternatively, when a SEND_LFPS control signal is asserted, the state machine transitions from idle state 602 to a third state (S2) 606. In state 606, the state machine asserts the power-up control signal sm_pu, thereby powering up the multiplexer and transmitter driver (508 and 512, respectively, in FIG. 5). As previously described, the sm_pu signal, being a logic "1," also selects the state machine data path in the multiplexer. The state machine then sends a continuous burst of reference clocks representing an LFPS message, or alternative out-of-band message, on sm_data, to the transmitter driver (e.g., 512) (through the multiplexer) for transmission to the host controller. The clock bursts in message signal sm_data are sent until the SEND_LFPS signal is de-asserted, as previously described. After completion of the LFPS message, the sm_pu signal is de-asserted, thereby powering down the multiplexer and transmitter driver. The state machine then returns to the idle state 602.

Figure 7:
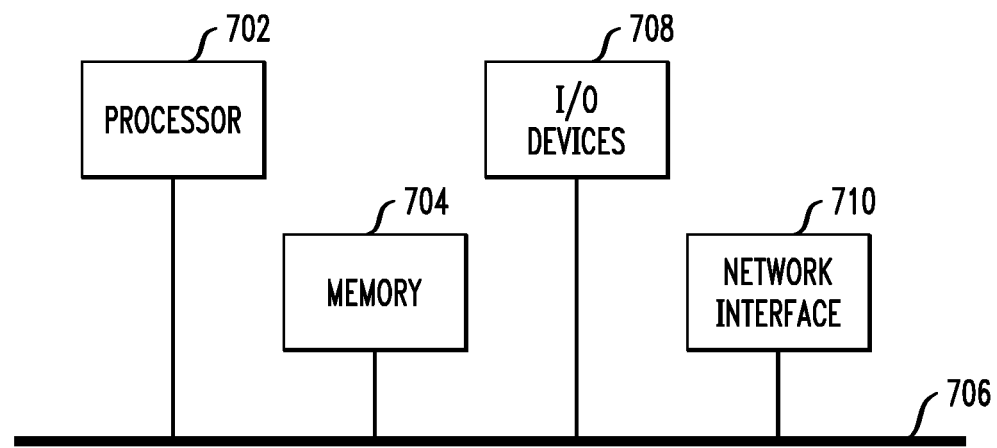
FIG. 7 is a block diagram depicting an exemplary data processing system in which principles of the present invention may be employed, according to an embodiment of the invention.

The methodologies of embodiments of the present invention may be particularly well-suited for implementation in an electronic device or alternative system, such as, for example, a portable electronic device. By way of illustration only, FIG. 7 is a block diagram depicting an exemplary data processing system 700, formed in accordance with an aspect of the invention. System 700 may represent, for example, a mobile device (e.g., USB device, SATA device, SAS device, etc.) adapted for communicating with a host device using a serial communications protocol. System 700 may include a processor 702, memory 704 coupled to the processor, as well as input/output (I/O) circuitry 708 operative to interface with the processor. The processor 702, memory 704, and I/O circuitry 708 can be interconnected, for example, via a bus 706, or alternative connection means, as part of data processing system 700. Suitable interconnections, for example via the bus, can also be provided to a network interface 710, such as a network interface card (NIC), which can be provided to interface with a computer network, and to a media interface, such as a diskette or CD-ROM drive, which can be provided to interface with media. The processor 702 may be configured to perform at least a portion of the methodologies of the present invention described herein above.

It is to be appreciated that the term "processor" as used herein is intended to include any processing device, such as, for example, one that includes a central processing unit (CPU) and/or other processing circuitry (e.g., network processor, DSP, microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, one or more output devices (e.g., printer, monitor, etc.) for presenting the results associated with the processor, and/or interface circuitry for operatively coupling the input or output device(s) to the processor.

Accordingly, an application program, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 702. In any case, it is to be appreciated that at least a portion of the components shown in FIG. 1 may be implemented in various forms of hardware, software, or combinations thereof, e.g., one or more DSPs with associated memory, application-specific integrated circuit(s), functional circuitry, one or more operatively programmed general purpose digital computers with associated memory, etc. Given the teachings of the invention provided herein, one of ordinary skill in the art will be able to contemplate other implementations of the components of the invention.

At least a portion of the techniques of the present invention may be implemented in one or more integrated circuits. In forming integrated circuits, die are typically fabricated in a repeated pattern on a surface of a semiconductor wafer. Each of the die includes a memory described herein, and may include other structures or circuits. Individual die are cut or diced from the wafer, then packaged as integrated circuits. One skilled in the art would know how to dice wafers and package die to produce integrated circuits. Integrated circuits so manufactured are considered part of this invention.

An IC in accordance with embodiments of the present invention can be employed in any application and/or electronic system which utilizes memory (e.g., embedded or discrete memory). Suitable systems for implementing embodiments of the invention may include, but are not limited to, personal computers, communication networks, electronic commerce systems, portable communications devices (e.g., cell phones), solid-state media storage devices, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A signal generator circuit for reducing power consumption of out-of-band message communications between a first device, in which the signal generator circuit resides, and a second device in operative communication with the first device, the signal generator circuit comprising:
    a switching circuit; and
    a controller coupled to the switching circuit, the switching circuit and controller being connected in a transmitter data path of the first device, the controller being operative: to receive a reference clock signal; to receive at least a first control signal indicative of a request for the first device to send an out-of-band message to the second device, when the first device is in a first mode of operation; to generate an output control signal, the output control signal being operative as a function of the at least first control signal to selectively power up the switching circuit and a transmitter driver while remaining functional blocks in a transmitter portion of the first device remain powered off during the first mode; and to generate an output data signal, the output data signal comprising the out-of-band message supplied to the transmitter driver, via the switching circuit, for transmission to the second device during the first mode;
    wherein an established connection is maintained between the first and second devices without a need to power up substantially all of the transmitter portion of the first device when the first device is in the first mode of operation, and wherein upon assertion of the first control signal during the first mode, the controller powers up the switching circuit and the transmitter driver, and upon de-assertion of the first control signal during the first mode, the controller is operative to power down the switching circuit and transmitter driver.

2. The signal generator circuit of claim 1, wherein the switching circuit comprises a first input for receiving the output data signal generated by the controller, a second input for receiving an output data stream generated by transmitter data path circuitry in the first device when the first device is in a second mode of operation, and an output for selectively conveying one of the output data signal and the output data stream to the transmitter driver as a function of a selection signal supplied to the switching circuit.

3. The signal generator circuit of claim 2, wherein the selection signal supplied to the switching circuit is the output control signal generated by the controller.

4. The signal generator circuit of claim 1, wherein at least one of transmitter data path circuitry, transmitter clock path circuitry and a clock multiplication unit in the first device remains powered down during the first mode.

5. The signal generator circuit of claim 1, wherein the controller comprises at least one state machine.

6. The signal generator circuit of claim 1, wherein the switching circuit comprises a multiplexer.

7. The signal generator circuit of claim 1, wherein the first mode of operation is a power-down mode of the first device and a second mode of operation is an active mode of the first device.

8. The signal generator circuit of claim 1, wherein the first control signal indicative of a request for the first device to send a message to the second device is generated by a link layer in the first device.

9. An integrated circuit, comprising at least one signal generator circuit according to claim 1.

10. A signal generator circuit for reducing power consumption of out-of-band message communications between a first device, in which the signal generator circuit resides, and a second device in operative communication with the first device, the signal generator circuit comprising:
    a switching circuit; and
    a controller coupled to the switching circuit, the switching circuit and controller being connected in a transmitter data path of the first device, the controller being operative: to receive a reference clock signal; to receive at least a first control signal indicative of a request for the first device to send an out-of-band message to the second device, when the first device is in a first mode of operation; to generate an output control signal, the output control signal being operative as a function of the at least first control signal to selectively power up the switching circuit and a transmitter driver while remaining functional blocks in a transmitter portion of the first device remain powered off during the first mode; to generate an output data signal, the output data signal comprising the out-of-band message supplied to the transmitter driver, via the switching circuit, for transmission to the second device during the first mode; and to receive a second control signal, the first control signal being indicative of a request to send a ping message to the second device during the first mode, the second control signal being indicative of a request to send a low frequency periodic signaling (LFPS) message to the second device during the first mode.

11. The signal generator circuit of claim 10, wherein upon assertion of the first control signal, the output data signal generated by the controller comprises a prescribed number of cycles of the reference clock, or upon assertion of the second control signal, the output data signal is operative to generate continuous cycles of the reference clock until the second control signal is de-asserted.

12. The signal generator circuit of claim 10, wherein upon assertion of the first control signal, the output data signal generated by the controller comprises a number of cycles of the reference clock that is independent of a duration of assertion of the first control signal, and upon assertion of the second control signal, the output data signal comprises a number of cycles of the reference clock that is dependent upon a duration of assertion of the second control signal.

13. A signal generator circuit for reducing power consumption of out-of-band message communications between a first device, in which the signal generator circuit resides, and a second device in operative communication with the first device, the signal generator circuit comprising:
  a switching circuit;
  a controller coupled to the switching circuit, the switching circuit and controller being connected in a transmitter data path of the first device, the controller being operative: to receive a reference clock signal; to receive at least a first control signal indicative of a request for the first device to send an out-of-band message to the second device, when the first device is in a first mode of operation; to generate an output control signal, the output control signal being operative as a function of the at least first control signal to selectively power up the switching circuit and a transmitter driver while remaining functional blocks in a transmitter portion of the first device remain powered off during the first mode; and to generate an output data signal, the output data signal comprising the out-of-band message supplied to the transmitter driver, via the switching circuit, for transmission to the second device during the first mode; and
  a functional OR circuit including a first input for receiving the output control signal generated by the controller, a second input for receiving a power-up signal generated by a transmitter clock path circuitry in the first device during a second mode of operation of the first device, and an output coupled to the switching circuit and adapted for connection to the transmitter driver and operative to generate a control signal for selectively powering up the switching circuit and the transmitter driver as a function of at least one of the output control signal generated by the controller and the power-up signal generated by the transmitter clock path circuitry.

14. A serial device having reduced power consumption for out-of-band message communications between the serial device and a host device in operative communication with the serial device, the serial device comprising:
  a transmitter, including data path circuitry operative to receive an input data word and to generate an output data stream, clock path circuitry operative to generate at least one control signal for controlling processing of the input data word, and a driver operative to transmit the output data stream to the host device;
  a clock multiplication unit operative to generate at least one timing signal for use by the clock path circuitry in the transmitter; and
  a signal generator circuit connected with the transmitter data path circuitry, the signal generator circuit comprising:
    a switching circuit; and
    a controller coupled to the switching circuit, the controller being operative: to receive a reference clock signal; to receive at least a first control signal indicative of a request for the serial device to send an out-of-band message to the host device, when the serial device is in a first mode of operation; to generate an output control signal, the output control signal being operative as a function of the at least first control signal to selectively power up the switching circuit and the driver while remaining functional blocks in the transmitter remain powered off during the first mode; and to generate an output data signal, the output data signal comprising the out-of-band message supplied to the driver, via the switching circuit, for transmission to the host device during the first mode;
  wherein an established connection is maintained between the serial and host devices without a need to power up substantially all of the transmitter in the serial device when the serial device is in the first mode of operation, and wherein upon assertion of the first control signal during the first mode, the controller powers up the switching circuit and the driver in the transmitter, and upon de-assertion of the first control signal during the first mode, the controller is operative to power down the switching circuit and transmitter driver.

15. The serial device of claim 14, wherein at least one of the transmitter data path circuitry, the transmitter clock path circuitry and the clock multiplication unit in the serial device remain powered down during the first mode.

16. The serial device of claim 14, wherein the switching circuit comprises a first input for receiving the output data signal generated by the controller, a second input for receiving the output data stream generated by the data path circuitry in the transmitter when the serial device is in a second mode of operation, and an output for selectively conveying one of the output data signal generated by the controller and the output data stream generated by the data path circuitry to the driver as a function of a selection signal supplied to the switching circuit.

17. The serial device of claim 16, further comprising a functional OR circuit including a first input for receiving the output control signal generated by the controller, a second input for receiving a power-up signal generated by the clock path circuitry in the transmitter during a second mode of operation of the serial device, and an output coupled to the switching circuit and adapted for connection to the driver in the transmitter and operative to generate a control signal for selectively powering up the switching circuit and the driver as a function of at least one of the output control signal generated by the controller and the power-up signal generated by the clock path circuitry.

18. A serial device having reduced power consumption for out-of-band message communications between the serial device and a host device in operative communication with the serial device, the serial device comprising:
   a transmitter, including data path circuitry operative to receive an input data word and to generate an output data stream, clock path circuitry operative to generate at least one control signal for controlling processing of the input data word, and a driver operative to transmit the output data stream to the host device;
   a clock multiplication unit operative to generate at least one timing signal for use by the clock path circuitry in the transmitter; and
   a signal generator circuit connected with the transmitter data path circuitry, the signal generator circuit comprising:
      a switching circuit; and
      a controller coupled to the switching circuit, the controller being operative: to receive a reference clock signal; to receive at least a first control signal indicative of a request for the serial device to send an out-of-band message to the host device, when the serial device is in a first mode of operation; to generate an output control signal, the output control signal being operative as a function of the at least first control signal to selectively power up the switching circuit and the driver while remaining functional blocks in the transmitter remain powered off during the first mode; to generate an output data signal, the output data signal comprising the out-of-band message supplied to the driver, via the switching circuit, for transmission to the host device during the first mode; and to receive a second control signal, the first control signal being indicative of a request to send a ping message to the host device during the first mode, the second control signal being indicative of a request to send a low frequency periodic signaling (LFPS) message to the host device during the first mode.

19. The serial device of claim 18, wherein upon assertion of the first control signal, the output data signal generated by the controller comprises a prescribed number of cycles of the reference clock, and upon assertion of the second control signal, the output data signal is operative to generate continuous cycles of the reference clock until the second control signal is de-asserted.

20. The serial device of claim 18, wherein upon assertion of the first control signal, the output data signal generated by the controller comprises a number of cycles of the reference clock that is independent of a duration of assertion of the first control signal, and upon assertion of the second control signal, the output data signal comprises a number of cycles of the reference clock that is dependent upon a duration of assertion of the second control signal.

21. A method for reducing power consumption of out-of-band message communications between a first device and a second device in operative communication with the first device, the method comprising the steps of:
   receiving, in the first device, a reference clock signal;
   receiving, in the first device, at least a first control signal indicative of a request for the first device to send an out-of-band message to the second device when the first device is in a first mode of operation, the out-of-band message indicating a presence of the first device to the second device;
   generating, in the first device, an output control signal and an output data signal, the output control signal being operative as a function of the at least first control signal to selectively power up a switching circuit and a transmitter driver while remaining functional blocks in a transmitter portion of the first device remain powered off during the first mode, the output data signal comprising the out-of-band message supplied to the transmitter driver, via the switching circuit, for transmission to the second device during the first mode, the out-of-band message being synchronized to the reference clock signal; wherein an established connection is maintained between the first and second devices without a need to power up substantially all of the transmitter portion of the first device when the first device is in the first mode of operation;
   powering up the switching circuit and the transmitter driver upon assertion of the first control signal during the first mode; and
   powering down the switching circuit and transmitter driver upon de-assertion of the first control signal during the first mode.

* * * * *